US005581269A

United States Patent [19]

Butcher

[11] Patent Number: 5,581,269
[45] Date of Patent: Dec. 3, 1996

[54] METHOD OF USE OF MULTIPLE INPUT STYLI IN A SYSTEM OF MULTIPLE COMPUTERS

[75] Inventor: Lawrence Butcher, Mountain View, Calif.

[73] Assignee: Xerox Corporation, Stamford, Conn.

[21] Appl. No.: 340,139

[22] Filed: Nov. 15, 1994

Related U.S. Application Data

[63] Continuation of Ser. No. 991,810, Dec. 16, 1992, abandoned.

[51] Int. Cl.[6] .................................................. G09G 5/00
[52] U.S. Cl. ............................................. 345/1; 345/180
[58] Field of Search ................................... 345/156, 157, 345/172, 173, 174, 179, 180, 1, 2; 382/3, 13, 14, 57; 178/18, 19; 341/5, 15

[56] References Cited

U.S. PATENT DOCUMENTS

| 3,699,439 | 10/1972 | Turner | 324/71 |
|---|---|---|---|
| 3,857,022 | 12/1974 | Rebane et al. | 235/151 |
| 4,476,463 | 10/1984 | Ng et al. | 340/712 |
| 4,514,688 | 4/1985 | Whetstone | 324/208 |
| 4,650,926 | 3/1987 | Nakamura et al. | 178/18 |
| 4,678,869 | 7/1987 | Kable | 178/19 |
| 4,720,781 | 1/1988 | Crossland et al. | 340/825.35 |
| 4,736,445 | 4/1988 | Gundersen | 382/13 |
| 4,814,552 | 3/1989 | Stefik et al. | 178/18 |
| 4,827,084 | 5/1989 | Yaniv et al. | 178/18 |
| 4,839,634 | 6/1989 | More et al. | 340/712 |
| 4,882,674 | 11/1989 | Quint et al. | 364/200 |
| 4,884,068 | 11/1989 | Matheny | 340/707 |
| 4,972,496 | 11/1990 | Sklarew | 382/13 |
| 5,007,085 | 4/1991 | Greanias et al. | 380/25 |
| 5,199,068 | 3/1993 | Cox | 382/13 |

*Primary Examiner*—Richard Hjerpe
*Assistant Examiner*—Chanh Nguyen
*Attorney, Agent, or Firm*—R. Christine Jacobs; Tracy L. Hurt

[57] ABSTRACT

In a system of multiple computers connected by a network means, a method for using multiple input styli, each connected to an individual computer, to indicate input information on the display screen of any computer in the system. In a system in which there are many computers, a user of one computer may wish to indicate an input action on a second computer. In the present invention, all pens in a system are able to determine which computer they are writing on and an input position relative to that input computer, regardless of whether they belong to that computer, by determining an identifying "signature" of the computer based on the peak signal strength of a plurality of distinguishable signals in a complex signal produced on the computer display screen and sensed by the stylus. Each stylus is able to communicate with the software entity which can correctly interpret the measurement by using a computer network.

7 Claims, 4 Drawing Sheets

METHOD OF USE OF MULTIPLE INPUT STYLI IN A SYSTEM OF MULTIPLE COMPUTERS

This is a continuation of application Ser. No. 07/991,810, filed Dec. 16, 1992; now abandoned.

FIELD OF THE INVENTION

The present invention relates to a method for interactively interfacing with a system consisting of multiple computers. More specifically, the invention relates to techniques for providing a multiple computer system with multiple input styli, each stylus being able to interface with any one of multiple computer displays in the system.

BACKGROUND OF THE INVENTION

Most present stylus, or "pen," input systems for a computer consist of a stylus which either produces or detects an electrical signal. The stylus is placed against a piece of some signal medium, typically with a large surface area, which performs the conjugate function. For example, a piece of specially prepared glass might cover a computer display, or be incorporated as a computer display screen. Either case may be referred to as a "display screen." Whenever a stylus approaches or touches the display screen, the stylus may measure a signal which varies across the glass surface. Alternately, the stylus may emit a signal which is measured at the perimeter of the glass. In either case, the position of the stylus can be calculated. The system consists of a signal source, a signal detector, and an interface to a computer. For example, a square wave may be generated by the stylus or screen, and the receiving screen or stylus detector converts the serial data into digital words which indicate position. The sending apparatus, and the receiving apparatus that belongs to it, must share a common time base for the encoded data to be correctly recognized.

Various display systems are known which incorporate the capability for printing or writing onto a display screen, with a detector for sensing and encoding the location of the input device on the display screen and accurately determining input coordinate positions. Rebane et al., U.S. Pat. No. 3,857,022, acoustically locates the position of a stylus tapped against a screen. Whetstone, U.S. Pat. No. 4,514,688, determines the distance of a pointer position from a predetermined reference point by measuring magnetostrictively induced strain waves. More et al., U.S. Pat. No. 4,839,634 describes a portable electro-optic device preferably comprising a flat panel display, pen-sensing surface, and a pen, with means provided for sensing and encoding the position of the pen on the display surface.

Along with location sensing, positional accuracy is obtained by using methods for correcting for distortions and abnormalities in the regular array or the screen surface. Kable, U.S. Pat. No. 4,678,869 describes an apparatus, system and method which employ a surface which is excited with an a.c. source at terminal locations disposed at the edges of the surface. Reducing the area of grid elements at crossover positions and intermediate grounding terminals minimizes disruptive potential caused by capacitive coupling. A correction look-up table is developed as part of the manufacture of the apparatus to provide a regularly incremented sequence of address values developed from a signal domain computation. Nakamura et al., U.S. Pat. No. 4,650,926 provides correction for graphic surface non-linearities in an electrographic system wherein output readings are taken along a physical domain rectangular grid array, and these output readings are adjusted in their signal domain to establish a regularly incremented sequence of address values.

Some systems, such as described in Stefik et al., U.S. Pat. No. 4,814,552, may incorporate multiple input styli for a single computer by supplying identifying information in the encoded bitstream. An acoustic signal from each stylus is designed to be easy to convert to a location, and each contains a distinctive identification code so that the system can determine which stylus is the signal source.

One aspect that all of the above-mentioned systems have in common is that the device or devices supplying input signals and the device receiving the signals must share a common time base in order for the input signal to be correctly recognized.

A problem arises, however, in a system incorporating a family of multiple connected computers, each with an individual input device. In a system in which there are many computers, a user of one computer may wish to indicate an input action on a second computer. In an existing system, an input action could only be indicated on a computer using the device that is connected with that specific computer.

Ideally, a user using a first computer would like to use the stylus belonging to that first computer to indicate an input action on any of the family of computers in the multiple computer system. For example, a user of a portable computer with a pen input may walk up to a display for a second user's computer. The first user would like to indicate an input location on the second user's display, and points to the location on the second display with the pen from the first computer. A sensing input device for the first computer must be able to tell which computer display it is touching and approximate location coordinates for the position it is pointing to.

This problem can be solved by providing the input system with means to calculate the position of a stylus with respect to a computer display surface that may be independent of the computer to which the stylus is connected.

In the system of the present invention, all pens in a system are able to determine which computer they are writing on and an input position relative to that input computer, regardless of whether they belong to that computer, by determining an identifying "signature" of the computer. Each stylus is able to communicate with the software entity which can correctly interpret the measurement by using a computer network. Each stylus must be able to participate in the measurement of its location on any computer in the system, without sharing a time base with that computer. The present invention provides a method for the input device to discern useful information concerning position even though that device belongs to another computer.

The present invention additionally provides an input signal to the system which contains information about the input device source allowing the computer being acted upon the ability to distinguish what computer device is providing the input, so that computer can determine access rights and other information relating to the input device. Both frequency and time domain calculations may be used to recover stylus position and signal source information from the stylus detection measurements.

SUMMARY OF THE INVENTION

The present invention provides a position input device which can be used with one or more computer video display terminals which are each indicative of the display of a different computer. The input device of the present invention employs a pointer as complex signal receiver. Furthermore, the device according to the present invention may employ more than one pointer at a time, with each pointer resulting in a distinct position input.

A method is disclosed for using a position input device connected to a first computer to indicate a location on a second computer in a system of multiple computers connected to each other through a network. A composite signal comprising distinguishable signals indicative of the signature of the source is produced. An input location is selected on the second computer display screen with the input device of the first computer, and a signal is sensed at that location. The distinguishable signals in the composite signals are used to determine relative coordinates of the input location on the second computer.

It is an object of this invention to provide input styli which participate in measurement of location on a computer display without sharing a time base with that computer. Further, it is an object of the invention to provide a multiple computer system in which the input device belonging to any individual computer in the system is able to input information including location on any of the family of computers in a multiple computer system.

Another object of the invention is to provide a method for distinguishing input information to a computer from individual input styli not necessarily connected directly to that computer, so that the computer may concurrently recognize the location and identities of each of one or more input styli. A further object of the invention is to allow an input stylus to input position information to a computer that it is not necessarily connected to.

It is additionally an object of the present invention to provide a system in which a significant number of computer input devices are separately distinguishable to any computer in a multiple computer system.

The following description, the drawings and the claims further set forth these and other objects, features and advantages of the invention.

DETAILED DESCRIPTION

A. General Features

Figure 1:
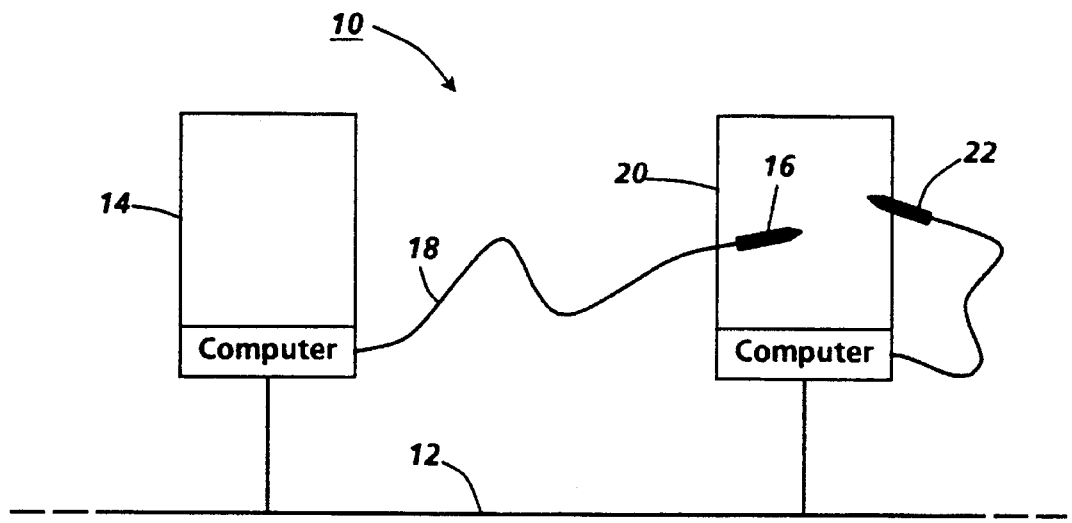
FIG. 1 shows a multiple computer system.

FIG. 1 shows a computer system 10 comprising at least two computers 14 and 20, connected for communicating via a communication network 12. An input device 16 is "connected to," or "belongs to," computer 14, and a second input device 22 belongs to computer 20. In the figure shown, input device 16 is shown as a stylus device, connected by a wire 18 to computer 14. It is clear that it need not necessarily be connected by a wire, but could also be connected to the computer it belongs to via infrared or radio type signals, for example.

In existing systems, stylus 16 would only be recognizable as an input device for computer 14, to which it belongs. The stylus and computer typically share a time base to allow recognition of parameters of the computer. A stylus which is not familiar with the time parameters of a given computer would not be able to discern any useful information from the signals transmitted by that computer.

However, in a system such as computer system 10, it is desirable for the user of computer 14 to be able to indicate an input action on computer 20 with stylus 16 (without changing styli), and for computer 20 to recognize input information from stylus 16, and recognize stylus 16 as belonging to computer 14. In this case, it is necessary for stylus 16 to be able to interact with computer 20, even though it does not belong to it.

Figure 2:
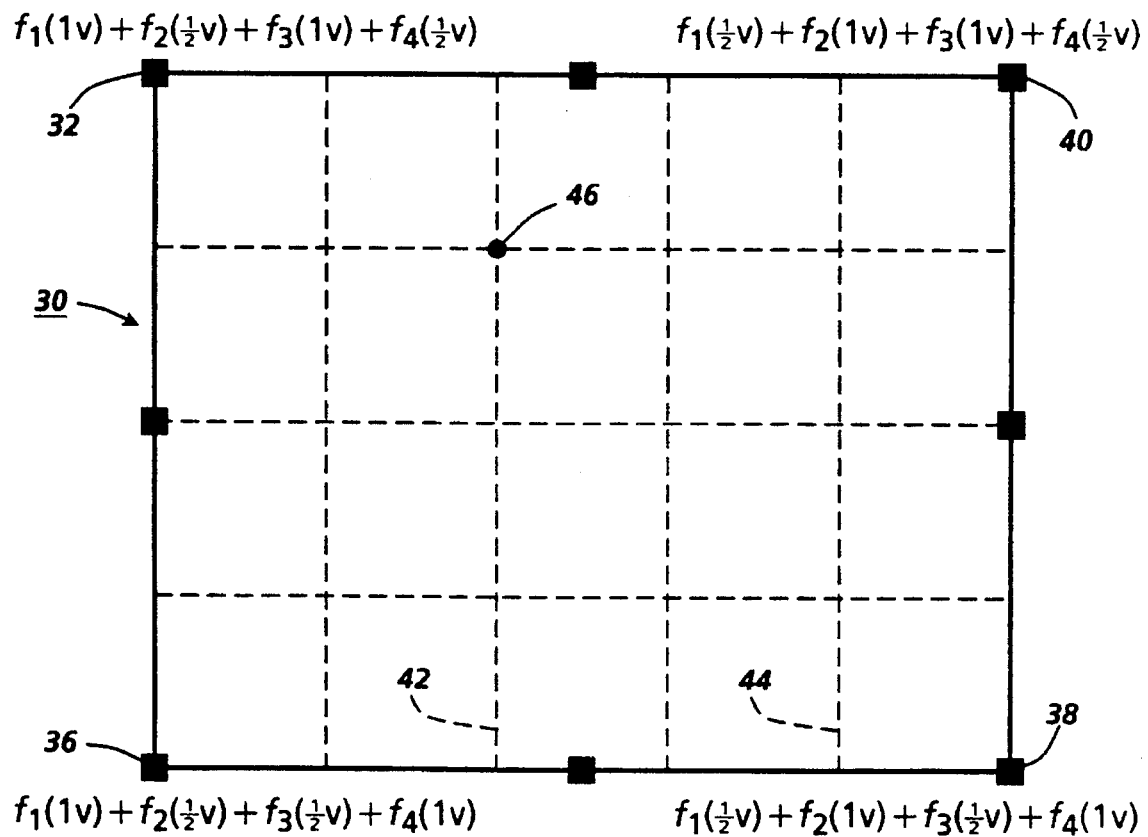
FIG. 2 illustrates a display screen such as might be associated with a computer in the multiple computer system.

FIG. 2 illustrates a display screen 30, as might be associated with a computer such as computer 14. Screen 30 has electrodes 32, 36, 38, 40, shown at the corners, which are used to drive signals across the screen. The geometry of the screen is not limited to the shape shown, and the screen may have many more than four electrodes along the edges of the screen, may use electrodes located at the midpoints of the screen, and the electrodes might be wide as well as point electrodes. However, for the purpose of the present discussion, it is convenient to consider only four point electrodes, one at each of four corners of a rectangular screen.

Electrical signals are driven across screen 30 in order to set up approximate grid lines, such as shown by line 42. This is done by driving a sine wave signal at a first frequency, $f_1$, at a given peak energy value, say 1 Volt, onto one edge of the screen from two electrodes such as 32 and 36. A signal of the same frequency, but half the energy (½Volt), is driven onto the screen from the opposite edge, from electrodes 38 and 40. This will form an energy field of frequency $f_1$ that is stronger at grid line 42, towards the edge of electrodes 32 and 36, and weaker at grid line 44, towards the edge of electrodes 38 and 40. A second frequency $f_2$ is driven in the same way but from the opposite sides, so that $f_2$ is strong at grid line 44, towards the edge of 38 and 40, and weaker at grid line 42, towards the edge of 32 and 36. Similarly, a third frequency $f_3$ is driven onto the screen so that it is strong at the top of the screen at the edge of 32 and 40, and weaker near the bottom edge of 36 and 38. A fourth frequency $f_4$ is driven from the bottom edge of 36 and 38 to the top edge of 32 and 40.

At each electrode then, a signal is driven onto the screen which contains a composite of the frequency signals $f_1$, $f_2$, $f_3$, and $f_4$. The signal driven onto the screen at electrode 32, may be described by:

$$f_1(1\ V)+f_2(\tfrac{1}{2}V)+f_3(1\ V)+f_4(\tfrac{1}{2}V).$$

Each electrode will drive a slightly different composite signal onto the screen. For example, the signal driven at electrode 36 may be described by:

$$f_1(1\ V)+f_2(\tfrac{1}{2}V)+f_3(\tfrac{1}{2}V)+f_4(1\ V).$$

The result of driving the composite signals onto the glass will be an approximately linear electrical pattern of grid lines such as shown on screen 30. Additional composite signals may be driven at additional electrodes, perhaps forming diagonal grids, to increase the positional accuracy.

If the stylus is touching input point 46 on the screen, the position of point 46 can be determined by measuring the composite signal and detecting the peak signal strength of each frequency. So that the user is able to determine both the position and gain of the signals, there must be at least two frequencies in each dimension to determine the two unknown values. A ratio of the signal strength of the two signals in each dimension may be used to determine the position in that dimension.

A signal may be added equally to the composite signals at each electrode and will have approximately the same peak signal strength at that frequency across the screen.

Figure 3:
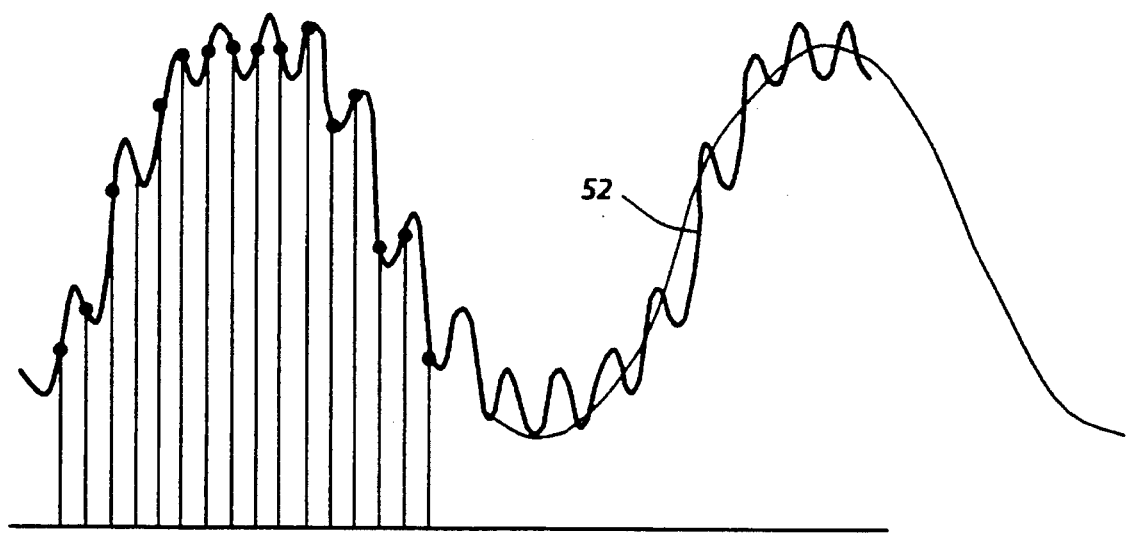
FIG. 3 shows an example of a composite signal.

An example of a composite signal that might be measured is shown in FIG. 3. It can be seen that signal 52 is a composite of sine waves. Using well-known sampling techniques and fast Fourier transform (FFT) calculations, signal 52 can be sampled at various points and separated into energy components representing the amplitude of the signal at each frequency, such as shown in FIG. 4 in the plot of energy components versus frequency 60.

Figure 4:
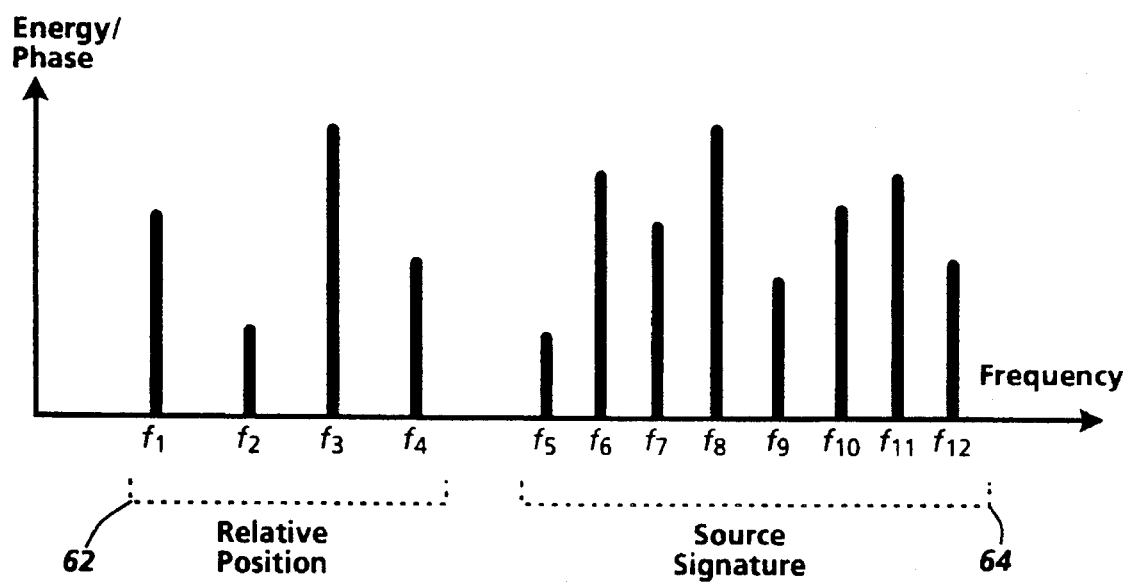
FIG. 4 is a plot of energy components versus frequency.

In energy plot 60 in FIG. 4, energy components are shown for each of a number of frequencies. Each energy component represents the amplitude of the signal at that frequency. These components may be used to determine the position of the input device detecting these frequencies, as well as a "signature" of amplitude components of the frequencies in a pattern which identifies the source of the signal. For example, signals $f_1$, $f_2$, $f_3$, and $f_4$, as discussed in relation to the description in FIG. 2 may produce component set 62 which indicates position on the screen. Further frequencies $f_5$, $f_6$, $f_7$, $f_8$, $f_9$, $f_{10}$, $f_{11}$, and $f_{12}$, represented by the set of components 64, may be added to the composite signals.

These frequencies $f_5$, $f_6$, $f_7$, $f_8$, $f_9$, $f_{10}$, $f_{11}$, and $f_{12}$ would be added equally at each electrode, so that the signature of the screen would be the same at all positions on the screen. Different frequencies within a band of frequencies, or similar frequencies with different amplitudes or phase, may be applied for each different screen, thereby producing a different signature for each screen and computer. Each screen must have a distinguishable digital signature, controlled by the frequencies generated on the screen. The screen which is being pointed to by the input device can be identified by any other computer which is pointing to it by identifying its signature. The components are shown in sets 62 and 64 for illustrative purposes. Clearly, the frequencies and amplitudes for identifying position and signature may be interchanged or interleaved as appropriate for the system.

Alternatively, each computer screen may be identified by the frequencies that are used for position location (i.e., one computer may use $f_{n_1}$, $f_{n_2}$, $f_{n_3}$, and $f_{n_4}$, and a second computer use $f_{k_1}$, $f_{k_2}$, $f_{k_3}$, and $f_{k_4}$.) The signal strengths may indicate relative position, while the frequencies used may themselves indicate the signature of the screen. However, in such a system the number of possible frequency combinations would then be limited, so that the number of separately distinguishable computers in the system must be limited. Considering the peak signal strength of each frequency in determining the signature determination, and using separate signals for position determination, allows a significantly higher number of computers to be used in the system than if the frequency alone is indicative of the signature.

Further, time-domain signals may be used to supplement frequency-domain information. For example, binary data describing the signal source "signature" might be used to vary the amplitude of a signal at a frequency, the amplitude variation being repeated indefinitely. The computer receiving the signal from the input device will track the amplitude of the signal at that frequency until the complete series of amplitude variation is recorded. This series of amplitude variations then is used to identify the signature of the source.

Figure 5:
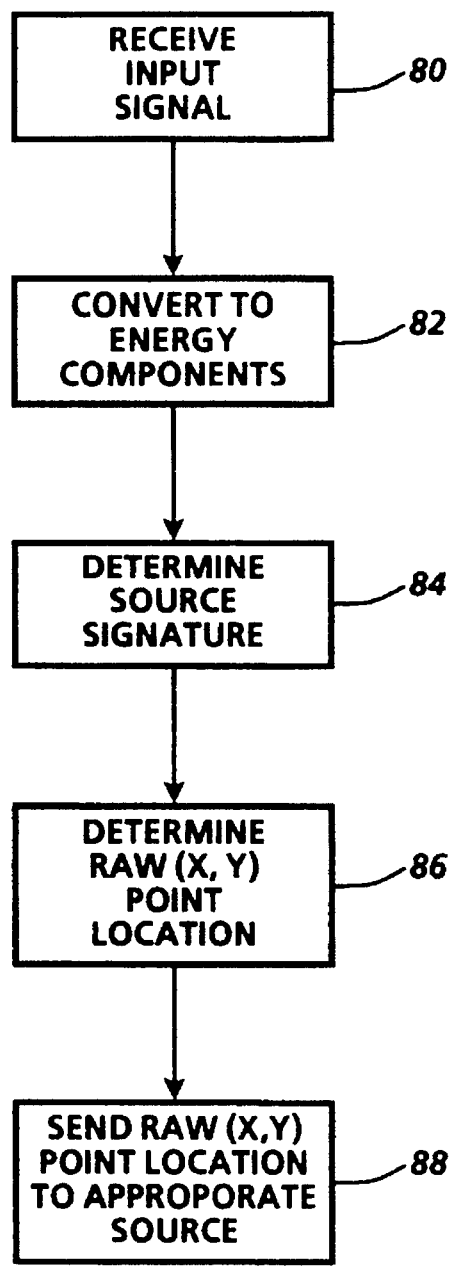
FIG. 5 describes a method performed by the computer to which the input device belongs for obtaining input information.
Figure 6:
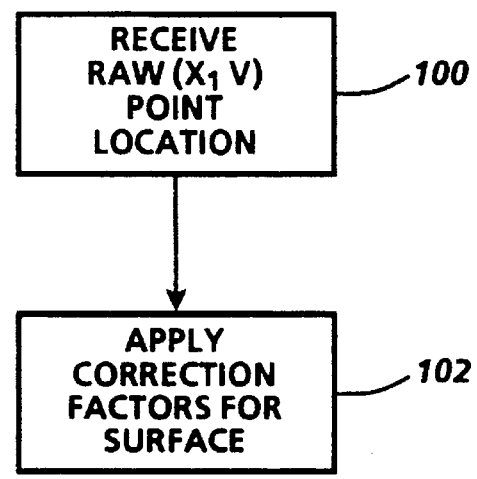
FIG. 6 describes a method performed by the computer which the input device is pointing to for using the input information from FIG. 5.

FIGS. 5 and 6 describe a method of obtaining the information as described in relation to FIGS. 3 and 4. The steps in FIG. 5 are performed by the computer which is connected with the input device, such as by computer 14 and stylus 16 shown in FIG. 1. This need not necessarily be the same computer which the input device is getting information from. The step in box 80 receives an input signal such as signal 52 in FIG. 3. The step in box 82 converts this analog signal into energy components versus frequency information, e.g., set 64 in FIG. 4, indicative of the frequencies in the signal using standard signal processing techniques. The step in box 84 uses component set 64 information to determine the signature of the input signal, and therefore, the signature and identity of the source. The computer may also distinguish a stylus signature or function selection information, depending on the needs and capabilities of the system.

The step in box 86 uses component set 62 information to determine a "raw (x,y)" input point location based on the ratio of the frequency amplitudes. The step in box 88 sends this raw (x,y) value, with any additionally obtained function or stylus information to the appropriate source computer as determined from the source signature via the network connection of the system.

The steps in FIG. 6 are performed by the computer which the input device is pointing to, such as computer 20 being pointed to by stylus 16 in FIG. 1. As mentioned above and shown in the figure, this may not be the computer which the input device belongs to. The step in box 100 receives the raw (x,y) point location. In the step in box 102, the correction factors which apply to that specific surface are used with the raw (x,y) location to obtain an actual position on the screen. These correction factors may be previously determined by any of the many well-known methods for normalizing a screen, such as used in Kable or Nakamura et al.

Function or selection information from the input device, such as might be indicated by pushing a button on a pen, may be added to the input signal, detected by the connected computer, and transmitted to the source computer along with the location information.

B. An Implementation

Figure 7:
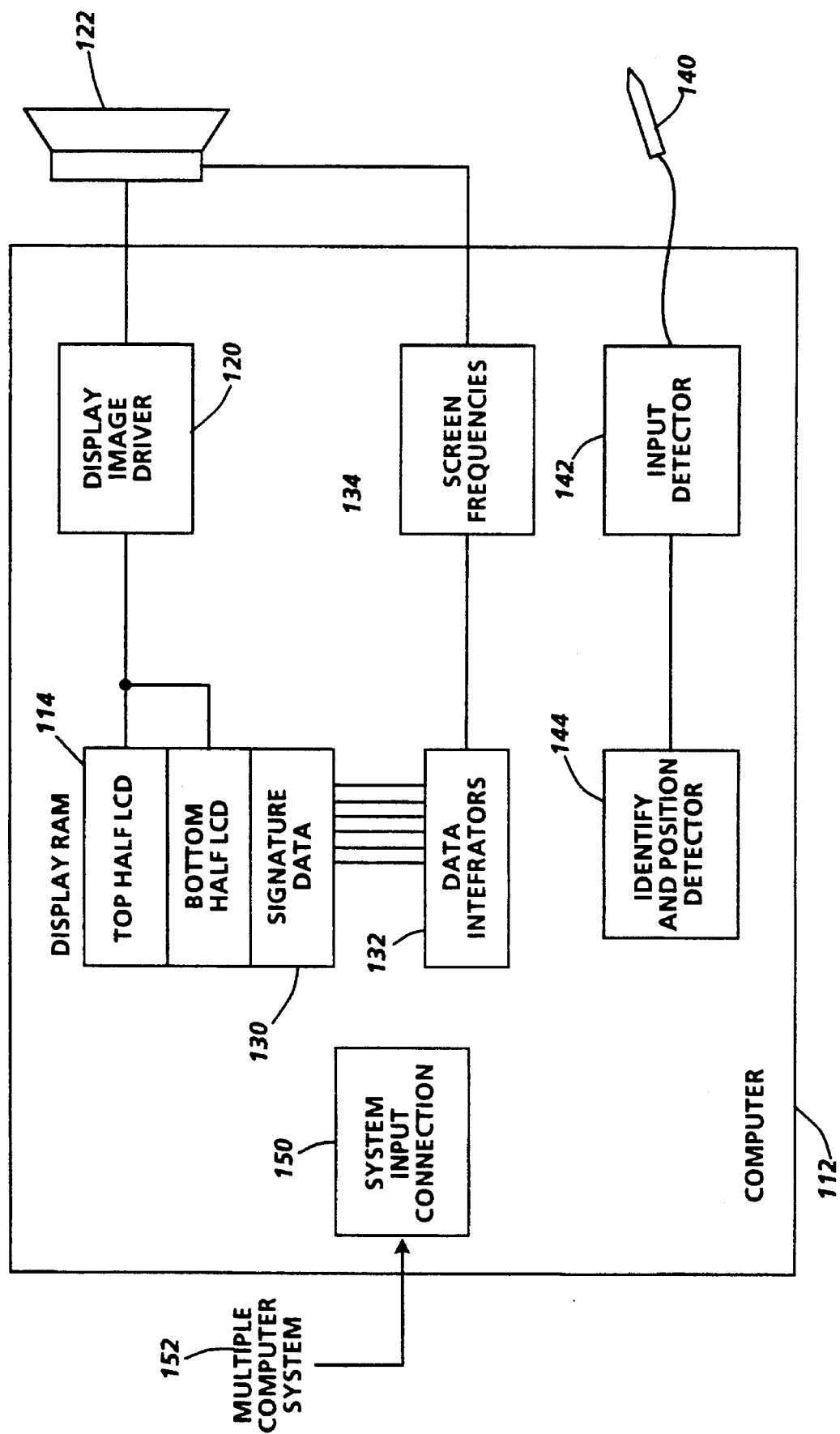
FIG. 7 shows a block diagram of system that might be used to perform the technique of the present invention.

FIG. 7 shows a block diagram of system 110 that might be used to perform the technique of the present invention. The diagram shows a computer 112 which is connected to a multiple computer system 152 through a network connection 150. This connection could be any kind of system network, such as a wired or wireless local area network. Computer 112 has connected to it display 122 and input stylus 140. Display RAM 114 contains information for driving the image on the display as well as for generating the frequency information which will be driven onto each electrode of the screen. In the implementation shown, the display RAM is divided into sections which contain information for the top and bottom halves of a liquid crystal display (LCD). This data is used to form the display image 120 which is shown on LCD display 122.

RAM 114 also contains a data area 130 that stores data which is used to generate frequency data for the screen, which is used for providing the position grid and signature of the screen. In the implementation shown, eight individual bits of data are used to provide eight independent signal sources. These sources can be used to drive eight separate electrodes on the screen. Each of the eight data lines provides pulse code modulated digital data through data integrators 132, which may be low pass filters, to derive analog frequency screen signals 134 which are driven onto the screen as described in relation to FIG. 2. The actual frequencies used in a system will be dependent upon many engineering factors, including but not limited to the technology of the screen and input devices, optimum voltages for the devices used and power requirements of the system.

Input stylus 140 picks up signals from a screen (which may be screen 122, or the screen from another computer in the system [not shown]), which are detected and converted into frequency component indicators by detector 142. The resulting frequency components are used by the identity and position logic 144 to determine the source and relative input position data. This data may be acted upon by computer 112 if it is determined to be the source, or the data may be sent via network 150 to the appropriate source computer (not shown) in computer system 152. Function selection information may also be supplied via input stylus 140.

In the system shown, the screen of display 122 may consist of a piece of glass with a resistive coating with a ring of metal electrodes, such as is found on many available "pen input" computer systems. Input stylus 140 is a solid brass pen device such as is used in some pen input systems. The brass tip provides a good conducting surface that is relatively soft and has no particles or sharp edges to scratch the resistive coating of the glass.

C. Miscellaneous

Although shown with a system of two computers and two input styli, the method is designed to enable a system with large numbers of individual computers, each separately distinguishable by the screen signature of the computer display or displays connected to that computer.

The system is not limited to computers with single input styli devices. Clearly, a computer with two or more styli which belong to it could perform the method of the invention for each of its styli, providing information to the source computer indicating which individual styli selected the input position along with computer and position identification information as described above.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed:

1. A method of using a position input device connected to a first computer to indicate an input location on a second computer, the first and second computers being independent computers not synchronized with respect to each other, the first and second computers being connected to each other through a communications network, the first computer having an input pointing device, and the second computer having a display screen, the method comprising the steps of:

producing on the display screen of the second computer a composite signal comprising a plurality of distinguishable signals;

selecting an input location on the display screen of the second computer with the input device of the first computer;

sensing said composite signal at said input location with the input device of the first computer;

distinguishing said distinguishable signals in said sensed composite signal using the first computer;

identifying said second computer from said distinguishable signals using the first computer; and using the first computer to determine relative coordinates of said input location on the display screen of the second computer from said distinguishable signals.

2. The method of claim 1, further comprising a step of sending said relative coordinates of said input location to the second computer through the connecting communications network.

3. The method of claim 1, further comprising a step of applying said composite signal to the display screen of the second computer such that relative strength of said distinguishable signals varies with position on the display screen; and the step of sensing said composite signal further comprising sensing said composite signal with the input pointing device of the first computer.

4. The method of claim 1, wherein said composite signal comprises a plurality of distinguishable signals, said distinguishable signals including signals which are indicative of an identifying signature of the composite signal source.

5. In a system of multiple independent, unsynchronized computers connected by a communications network, each computer having a display screen and an input device responsive to signals produced by a display screen, the method of selecting an input location on the screen of a first computer using the input device of a second computer, comprising the steps of:

generating a complex signal field on the display screen of the first computer so that at any location on the screen there exists a composite signal comprising a plurality of predetermined frequencies, each with a peak signal level;

positioning the input device of the second computer at a desired input location on the display screen of the first computer;

sensing a composite signal at the input location with the input device of the second computer;

distinguishing the signals of said composite signal;

identifying the first computer from said distinguished signals;

identifying relative coordinates of said desired input location; and sending said relative coordinates of said desired input location to the first computer through the communications network.

6. A system of multiple computers connected to a communications network comprising at least first and second computers, said computers not synchronized with respect to each other, wherein each computer comprises a display screen and an input device responsive to signals from a display screen, comprising:

means associated with the first computer for producing a composite signal on the display screen of the first computer, said composite signal comprising a plurality of distinguishable signals, said distinguishable signals including signals indicative of a pattern of electrical components of the first computer, said distinguishable signals further including signals indicative of position on the display screen of the first computer;

means associated with the input device of the second computer for sensing said composite signal at a location on the display screen of the first computer pointed to by the input device of the second computer;

means associated with the second computer for separating said distinguishable signals in said composite signals;

means associated with the second computer for determining said pattern of electrical components indicating identity of the first computer from said separated distinguishable signals;

means associated with the second computer for determining relative coordinates of said location of the input device of the second computer on the display screen of the first computer from said separated distinguishable signals; and means associated with the second computer for sending said relative coordinates to said first computer through the communications network connection.

7. The method of claim 6, wherein each of said position indicating distinguishable signals has a peak signal strength which varies according to position of the input device of the second computer on the first computer display screen.

* * * * *